United States Patent [19]
Thomas

[11] Patent Number: 5,379,672
[45] Date of Patent: Jan. 10, 1995

[54] SAW BLADE WITH CUTTING WINGS

[76] Inventor: Milton L. Thomas, 1499 Emory Rd., Atlanta, Ga. 30306

[21] Appl. No.: 81,076

[22] Filed: Jun. 22, 1993

[51] Int. Cl.$^6$ ............................................. B27B 33/08
[52] U.S. Cl. ........................................ 83/837; 83/850; 83/854
[58] Field of Search .................... 83/837, 848–851, 83/854

[56] References Cited

U.S. PATENT DOCUMENTS

| | | | |
|---|---|---|---|
| 111,164 | 1/1871 | Andrews | 83/849 |
| 212,516 | 2/1879 | Schleicher | 83/848 |
| 238,521 | 3/1881 | Osgood | 83/850 |
| 964,602 | 7/1910 | Aldridge | 83/850 |
| 1,771,722 | 7/1930 | Prentice | 83/850 |
| 1,820,434 | 8/1931 | Busque | 83/854 |
| 2,770,267 | 11/1956 | Edmiston | 83/848 |
| 3,181,577 | 5/1965 | Gaskins | 83/854 |
| 4,641,562 | 2/1987 | Clarke | 83/837 |
| 4,802,396 | 2/1989 | Kuklinski | 83/835 |
| 4,913,022 | 4/1990 | Kuklinski | 83/849 |

FOREIGN PATENT DOCUMENTS

| | | | |
|---|---|---|---|
| 509700 | 4/1956 | Germany | 83/855 |
| 756145 | 8/1956 | United Kingdom | 83/855 |
| 445569 | 10/1974 | U.S.S.R. | 83/837 |

*Primary Examiner*—Hien H. Phan
*Attorney, Agent, or Firm*—Jones & Askew

[57] ABSTRACT

A saw blade with cutting wings on the teeth. The blade has a blade body, teeth located on an outer edge of the blade body, and cutting wings extending from either side of each tooth on the blade body. Each tooth is angled in a direction opposite that of the adjacent teeth to eliminate block cutting characteristics and to enhance the serrating effect of the teeth. A first wing is longer than a second wing and contains a barb that enhances the serrating effect of the wing. Both wings are beveled so that the sharpest edge of the wings is located on the outer edge of the wings. The cutting wings pre-cut a width of the material and reduce the splintering and shredding effects of the blade on the material.

2 Claims, 2 Drawing Sheets

SAW BLADE WITH CUTTING WINGS

TECHNICAL FIELD

The present invention generally relates to cutting devices, and more particularly relates to an improved saw blade for minimizing splintering or shredding of the associated workpiece to be cut.

BACKGROUND OF THE INVENTION

Cutting saws come in numerous shapes and sizes and, from hacksaws to hand-held electrically-powered circular saws to large industrial table saws, are used for a variety of applications. Many varieties of saws are used by people in home maintenance and home improvement projects. These and other kinds of saws also are often indispensable tools for carpenters, construction workers, and the like. Large saws often are automated and used in heavy industrial situations. Regardless of shape, size or application, these devices have one thing in common: the saws allow one to take a piece or section of material that is often large, bulky and unmanageable and cut it into smaller pieces or sections suited for specific applications.

The surfaces on which these cutting saws are used are as varied as the kinds of saws themselves. Although one usually associates the use of saws with wood, saws are also used to cut plastic, metal and concrete. Many saws are capable of cutting several types of materials, while other more specialized saws are suited more for a single type of material. However, the type of material that a saw is intended to cut usually determines the kind of blade with which the saw is equipped.

One problem associated with cutting wood or similar fibrous materials with a conventional multi-purpose blade is the splintering effect of the blade as it cuts through the material. Conventional blades tend to rip through the material. A rough cutting edge is the end result because of the tearing effect on the material due to the ripping characteristics of the blade; that is, the blade does not cut all fibers cleanly. Rather, many of the fibers, especially as the saw blade initially enters the surface of the material, are torn and not cut. This results in a splintering or shredding of the material. The surface must then be sanded or otherwise smoothed and repaired. This added step results in increased cost, both in labor and in time. Often, if the surface was a finished surface before the cutting, irreparable damage may be caused by the saw.

In order to avoid this problem, a multiple parallel blade design has been proposed, as shown in U.S. Pat. No. 4,641,562. In a typical multiple blade arrangement, a longer blade (or blades) makes an initial rough ripping cut through the surface, followed by the smoother, more refined cutting action of a second blade (or blades). The blade making the initial cut contains teeth of a uniform length, and of a design well known to those skilled in the art, to facilitate the initial cut. The top outer edges of the outer cutting blade are the points of initial contact of the blade configuration with the surface. The initial transverse pressure exerted on the surface of the material by the top outer edges causes penetration of the surface by the blade edge into the material.

Alternatively, if the application is for cutting a soft, highly fibrous material such as palm wood wherein the fibers are more loosely associated than in other kinds of wood, a blade as disclosed in U.S. Pat. No. 3,181,577 may be used. Because of the softness of the surface and the lack of a need for an initial piercing blade edge to penetrate the softer, more easily penetrable surface, thin continuous parallel radial cutting edges are used for the initial cut. The continuous edges are knife-like in action and actually produce a slicing effect, while the teeth between the parallel outer blades carry away the severed bits of material. The knife-like outer blades initially slice the fibers and allow for easier cutting by the teeth. If a conventional blade were used to cut such a soft material, increased manual pressure would have to be applied to the saw itself because the fibers initially yield to a normal ripping saw blade before breaking.

However, problems are associated with these blades with pre-cutting edges. One problem associated with these blades is that a continuous pre-cutting edge as in U.S. Pat. No. 3,181,577 is not effective on harder surfaces that are more difficult to penetrate. Surfaces harder than palm wood require an edge that initially bites into the surface, allowing the remainder of each tooth to follow the initial penetration into the material. Without this initial biting action, a knife-like pre-cutting blade requires an operator to exert significantly more manual pressure on the blade to initially penetrate the material. This action causes much more wear on the blade itself through the additional pressure on the blade.

Further, pre-cutting blades of uniform radial length, while minimizing splintering and shredding, tend to accumulate with the cut fibrous material. For example, a blade with parallel pre-cutting blades of uniform length used to cut a plastic surface heats the cut plastic due to the friction involved during the cutting process. The plastic tends to partially melt and adhere to the blades. This partial melting clogs the blades, reducing their effectiveness and causing an increase in both job time and labor because one must periodically stop to clear the material from the blades. Blade designs, such as the designs disclosed in U.S. Pat. Nos. 4,641,562 and 3,181,577, if used on a wood surface, could experience similar clogging problems caused by the accumulation of cut wood particles.

Thus, there is a need for a blade with pre-cutting edges that minimizes splintering or shredding of the cut material and at the same time minimizes clogging of the blade with the cut material.

Another problem associated with prior saw blades with pre-cutting edges is that the outer pre-cutting edge of a blade tooth that makes the initial penetrating cut into the surface enters the material through the initial piercing action of the edge. The rest of the tooth follows the leading edge and finishes the cut of that particular tooth. Because each particular tooth on the blade has a single initial point of contact, the remainder of the tooth surface that follows the leading edge tends to rip, rather than slice, the material. This characteristic hinders these particular blades with pre-cutting edges because the problems that the blades are supposed to address—splintering and rough edges—remain to some extent.

Thus there is a need for a blade with pre-cutting edges that further reduce splintering and rough edges of the workpiece caused by the pre-cutting blade edges.

In light of these aforementioned needs, it is therefore an object of the present invention to provide an improved saw blade.

It is a further object of the invention to provide a saw blade that minimizes splintering or shredding of the material being cut.

It is another object of the invention to provide a saw blade that minimizes clogging of the blade with the material being cut.

It is a further object of the invention to provide a blade with pre-cutting edges that further reduce splintering and rough edges of the material being cut.

SUMMARY OF THE INVENTION

The present invention overcomes the aforementioned and other problems associated with the prior art. Stated generally, the present invention provides an improved saw blade with pre-cutting edges that minimize splintering or shredding of the material being cut and at the same time minimize clogging of the blade with the material being cut. The present invention also provides a saw blade with pre-cutting edges that further reduce splintering and rough edges caused by the pre-cutting blade edges.

Stated more specifically, in a first aspect, the present invention comprises a blade body, a plurality of teeth located on an outer edge of the blade body, a first cutting wing extending from a first side of each tooth and a second cutting wing extending from a second side of each tooth. Each tooth contains a leading edge in a predetermined cutting direction of the blade. Each leading edge contains an outer cutting edge. The first and second cutting wings pre-cut a width of the workpiece.

In the preferred embodiment of the present invention, the first wing extends from a side of each tooth and is in a first plane parallel to the plane containing the blade body. The second wing extends from a side opposite the side of the first wing on each tooth and is in a second plane parallel to the plane containing the blade body. The first cutting wing contains an edge concave in the predetermined cutting direction of the blade, and the edge contains a barb that protrudes outwardly in the predetermined cutting direction. The second cutting wing contains an edge concave in the predetermined cutting direction of the blade. Each tooth is also concave in the predetermined cutting direction of the blade body. The outer cutting edge of each tooth is angled in a direction opposite that of immediately preceding and subsequent angled outer cutting edges. The first cutting wing is longer than the second cutting wing, and the respective longer and shorter cutting wings are located on opposite sides of adjacent teeth.

Other objects, features and advantages of the present invention will become apparent upon reading the following specification, when taken in conjunction with the drawings and the appended claims.

DETAILED DESCRIPTION OF THE PREFERRED EMBODIMENT

Figure 1:
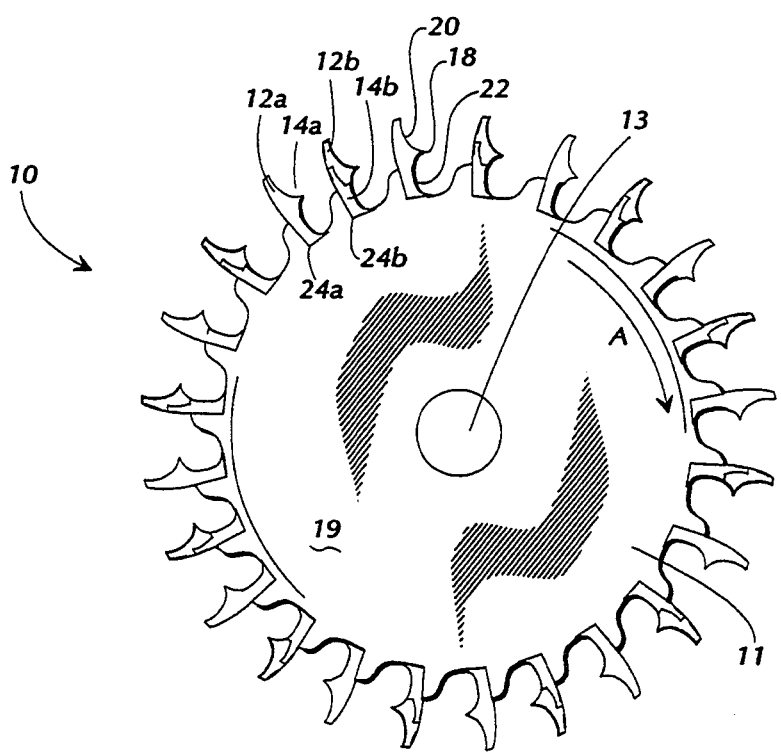
FIG. 1 is a side elevation view of a saw blade according to the preferred embodiment of the present invention.
Figure 5:
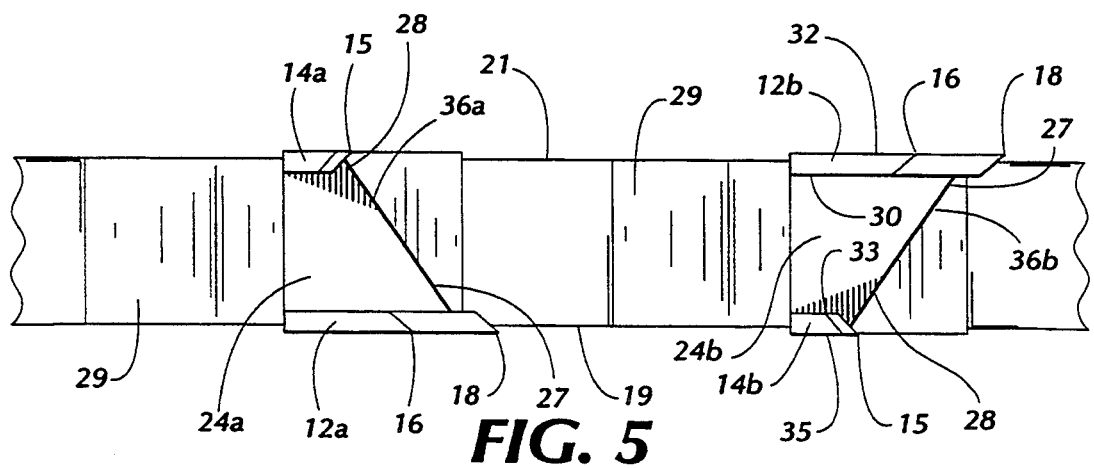
FIG. 5 is a top plan view of the saw blade as seen from above FIG. 1.

Referring now in detail to the drawings, FIG. 1 shows a saw blade generally at 10. The saw blade 10 has a circular blade body 11 with a central opening 13 to secure the blade body 11 to a circular saw through a retaining bolt of the saw (not shown). The blade body 11 has a plurality of teeth uniformly disposed around the exterior of the blade body 11, with the two consecutive teeth 24a, 24b representing those teeth. The teeth 24a, 24b each have a pair of cutting wings, represented generally by longer wings 12a, 12b and shorter wings 14a, 14b. The shorter wing 14a of the tooth 24a is hidden in FIG. 1 by longer wing 12a. As shown in FIG. 5, one shorter wing 14b and one longer wing 12b extend radially outwardly from a front side 19 and a back side 21 of each tooth in alternate order. As shown in FIGS. 1 and 5, the longer wing 12a of the tooth 24a flanks the front side 19 of that tooth, while the shorter wing 14b flanks the front side of the adjacent tooth 24b. The shorter wing 14a, behind longer wing 12a in FIG. 1, flanks the back side 21 of tooth 24a, while the longer wing 12b flanks the back side 21 of tooth 24b.

Figure 2:
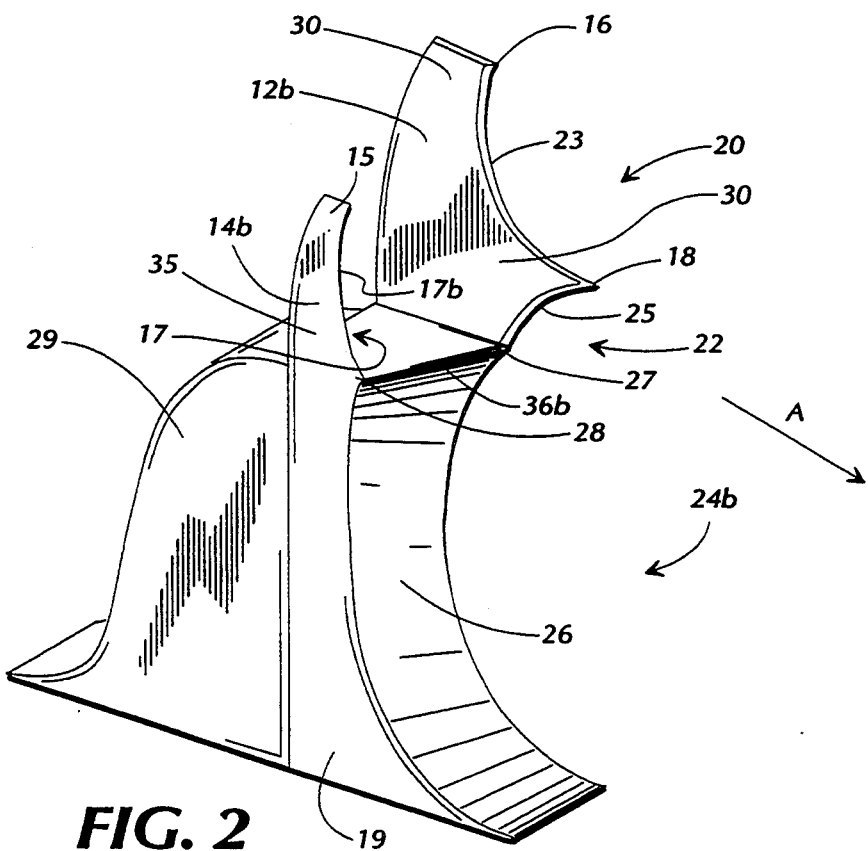
FIG. 2 is a perspective view of a saw tooth in the blade in FIG. 1.
Figure 4:
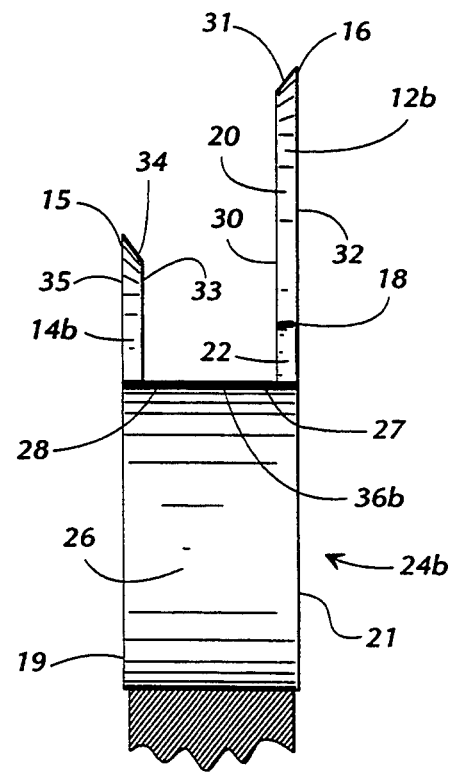
FIG. 4 is a front elevation view of the saw tooth seen from the right of FIG. 3.

As best shown in FIGS. 2 and 4, each longer wing 12b of the preferred embodiment is characterized by a leading edge 16 at the outermost radial extent of the wing, and upper and lower cutting segments 20, 22 facing forwardly in the predetermined cutting direction represented by the arrow A in FIG. 2. The cutting segments 20, 22 of the longer wings 12a, 12b have curved, forwardly-facing upper and lower edges 23, 25 that are generally concave and mutually intersect at a cusp that forms a barb 18. The edges 23, 25 of the cutting segments 20, 22 are beveled outwardly from the inner face 30 of the wing 12b to the outer face 32 thereof to form a sharp cutting edge 31. The shorter wing 14b also has a leading edge 15 at the outermost radial extent of that wing, and a forwardly-facing cutting segment 17 facing in the predetermined cutting direction indicated also by the arrow A. However, the cutting segment 17 of the shorter wing 14b in the preferred embodiment has only a single curved forwardly-facing edge 17b, and that edge 17b is beveled outwardly from the inner face 33 to the outer face 35 thereof to form the sharp cutting edge 34 as best seen in FIGS. 4 and 5.

The tooth 24a has a cutting segment 26 extending radially outwardly from the blade adjoining the blade body 11. The cutting segment 26 is concave in the predetermined direction indicated by the arrow at A. The outer end of the concave cutting segment 26 terminates at a cutting edge 36a that is angled with respect to the plane of the blade body 11, as best seen in FIG. 5, so that the cutting edge 36a extends from a leading edge 27 adjacent the forward end of the tooth 24a, where the longer wing 12a extends outwardly from the front side 19 of the tooth, to a trailing edge 28 adjacent the forward end of the tooth where the shorter wing 14a extends outwardly from the back side 21 of the tooth 24a. The rear body 29 of the tooth 24a returns radially inwardly to rejoin the blade body 11.

As shown in FIG. 2, the tooth 24b is a mirror image of tooth 24a in that the longer wing 12b is on the back side 21 opposite that of longer wing 12a. Likewise, shorter wing 14b is on the front side 19 opposite that of shorter wing 14a. As with tooth 24a, tooth 24b is also angled so that the cutting edge 36b extends from a leading edge 27 adjacent the forward end of the tooth, where the longer wing 12b extends outwardly from the back side 21 of the tooth 24b, to a trailing edge 28 adjacent the forward end of the tooth where the shorter wing 14b extends outwardly from the front side 19 of the tooth 24b. The rear body 29 of the tooth 24b returns radially inwardly to rejoin the blade body 11. The cutting segment and cutting edge of one tooth are thus angled in the opposite direction to the cutting segments and cutting edges of the two adjacent teeth.

The blade is designed so that the number of teeth with longer wings on the front side 19 and shorter wings on the back side 21 of the blade body 11 corresponds to the number of teeth with shorter wings on the front side 19 and longer wings on the back side 21 of the blade body 11.

It should now be evident that the consecutive teeth 24a and 24b repeat around the extent of the blade body 11. Any two adjacent teeth differ from each other in the front-back placement of the longer wings and shorter wings and in the directions of the angle of the teeth leading edges 27. Furthermore, the leading edges 15, 16 at the outermost radial extent of the longer and shorter wings are beveled outwardly from the inner face to the outer face of the wings to provide a cutting edge as seen in FIG. 4.

Figure 3:
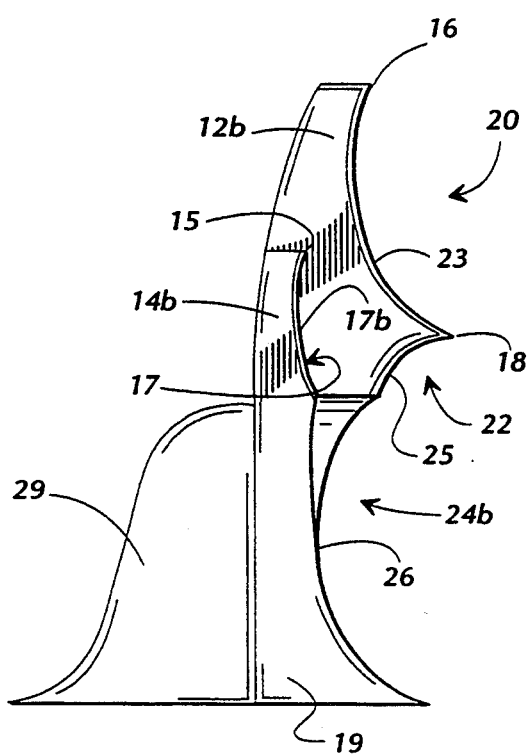
FIG. 3 is a side elevation view of the saw tooth of FIG. 2.

Turning to the structure of the cutting wings 12b and 14b, FIGS. 2 and 3 show that the longer wing 12b is concave in the predetermined cutting direction indicated by the arrow at A. The barb 18 extends outwardly in the predetermined cutting direction, indicated by the arrow A, to form the lower cutting segment 22 of the longer wing 12b. The wing then forms the upper cutting segment 20 by tapering outwardly, ending in and forming leading edge 16. The shorter wing 14b is also concave in the predetermined cutting direction indicated by the arrow at A and has cutting segment 17. As shown in FIG. 4, the edges 31 and 34 of wings 12b and 14b are beveled outwardly from the inner faces 30 and 33 to the outer faces 32 and 35 of the blades so that the edges taper, making the outermost edge of each wing the sharpest edge of the wing.

The function of the blade 10 in terms of its aforementioned elements will now be explained. When the blade 10 is rotated and engaged with a workpiece to be cut (not shown), the longer wing 12b first contacts and pierces the workpiece when the leading edge 16 pierces the surface of the workpiece. The barb 18 is present to reduce the radial length, or spread, of the surface of the longer wing 12b and thus to enhance the ability of the blade 10 to make a clean cut through the workpiece. By reducing the spread of the wing surface, the longer wing 12b exhibits greater piercing characteristics and decreased splintering or shredding associated with many of the prior art saw blades.

The upper cutting segment 20 and the lower cutting segment 22 of the longer wing 12b are concave in the cutting direction so as to provide a slicing effect, rather than a ripping effect, of the longer wing 12b through the workpiece. The shorter wing 14b also has cutting segment 17 concave in the cutting direction for the same aforementioned reasons associated with the longer wing 12b. The shorter wing 14b, being radially shorter than the longer wing 12b, needs no barb because the wing surface spread is not as great as the wing surface spread of the longer wing 12b and thus not as critical. The shorter wings and longer wings alternate from front side to back side on adjacent teeth to prevent the accumulation of cut material on and between the wings as the blade passes through the workpiece. The leading edge 16 of the longer wing 12b will always make initial contact with the workpiece. The leading edge 15 of the shorter wing 14b always follows the leading edge 16 of the longer wing 12b through the workpiece.

The wings have beveled edges 31 and 34, allowing the wings 12b and 14b to possess knife-like cutting characteristics rather than conventional saw ripping characteristics. The slicing effect reduces splintering and shredding because initial transverse pressure on the surface of the cutting material is reduced. Further, the beveled edges 31 and 34 are sharp tapered edges, which in turn exhibit enhanced cutting characteristics. The slicing effect produced by the edges 31 and 34 allows the wings 12b and 14b to achieve an initial penetration into the workpiece with minimal splintering or shredding and thus minimal damage to the surface of the workpiece.

With respect to the function of the tooth 24b, the cutting edge 36b, extending from the leading edge 27 to the trailing edge 28, and the concave segment 26 of the tooth 24b, are angled to enhance serrating characteristics. The tooth 24b cuts subsequent to the cuts of the wings 12b and 14b. The tooth 24b, along with the shorter wing 14b, always follows the initial cut of the longer wing 12b. The rear body 29 of the tooth supports the tooth 24b.

As shown in the top plan view of the preferred embodiment of FIG. 5, the orientation of the angled cutting edges 36a, 36b alternates from tooth to tooth as does the aforementioned orientation of the cutting wings. This alternate angled tooth configuration further enhances the cutting ability of the teeth and thus the blade 10 itself by eliminating the block cutting associated with saw blades not having alternating angled edges. Each tooth makes half of a cut in an angular carving fashion instead of taking out a full straight-on square bite, or block cut, which is characteristic of blades with non-angled teeth. The following alternating angled cutting edge makes the other half of the cut. Because the surface is not impacted by the entire face of the tooth at once, the blade 10 does not exert as much transverse pressure on the surface of the material being cut as would be exerted by a non-angled edge. This angled carving action eliminates much of the splintering or shredding associated with blades having non-angled edges. In addition, because the saw cuts with less resistance from the wood or other material being cut, this design also speeds up the cut of the saw.

The top plan view of FIG. 5 also shows the alternating configuration of the angled edges of the teeth and the alternating wing lengths used to eliminate the drawbacks associated with block cutting.

While the preferred embodiment has been disclosed with respect to a hand-held circular saw blade, it should be understood that the saw blade can also be of a design to be used with saws having non-circular blades such as hacksaws, coping saws, ripsaws, crosscut saws, carpenter's saws, saber saws, jigsaws, bayonet saws or scroll saws.

It should be further appreciated that while the rear body of the tooth in the preferred embodiment does not have a sharpened cutting edge, it may be designed with a sharpened cutting edge if the blade is used in a non-circular type blade or if the blade itself is capable of cutting in two directions.

Finally, it will be understood that the preferred embodiment has been disclosed by way of example, and that other modifications may occur to those skilled in the art without departing from the scope and spirit of the invention as defined in the appended claims.

I claim:

1. A saw blade for cutting a workpiece, the blade comprising:
   a blade body;
   a plurality of teeth located on an outer edge of said blade body, each tooth containing a leading edge in a predetermined cutting direction of said blade body and containing an outer cutting edge;
   a first cutting wing extending from a first side of each tooth, said first cutting wing containing an edge concave in said predetermined cutting direction;
   said edge containing a barb that protrudes outwardly in said predetermined cutting direction; and
   a second cutting wing extending from a second side of each tooth;
   wherein said first and second cutting wings pre-cut a width in the workpiece.

2. A saw blade for cutting a workpiece, the blade comprising:
   a blade body;
   a plurality of teeth located on an outer edge of said blade body, each tooth containing a leading edge in a predetermined cutting direction of said blade body, each tooth further containing an outer cutting edge;
   a first cutting wing extending from a first side of each tooth, said first cutting wing located in a first plane parallel to a vertical plane containing said blade body and containing an edge concave in said predetermined cutting direction;
   said edge containing a barb protruding outwardly in said predetermined cutting direction; and
   a second cutting wing extending from a second side of each tooth, said second cutting wing located in a second plane parallel to said vertical plane containing said blade body;
   wherein said first and second cutting wings pre-cut a width in the workpiece, said width corresponding to the width of the outer cutting edge of each tooth.

* * * * *